US010762423B2

(12) United States Patent
Henry

(10) Patent No.: US 10,762,423 B2
(45) Date of Patent: Sep. 1, 2020

(54) USING A NEURAL NETWORK TO OPTIMIZE PROCESSING OF USER REQUESTS

(71) Applicant: ASAPP, INC., New York, NY (US)

(72) Inventor: Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 16/057,438

(22) Filed: Aug. 7, 2018

(65) Prior Publication Data

US 2019/0065948 A1 Feb. 28, 2019

Related U.S. Application Data

(63) Continuation-in-part of application No. 15/634,733, filed on Jun. 27, 2017, now abandoned.

(51) Int. Cl.
*G06Q 10/06* (2012.01)
*G06N 3/08* (2006.01)
*G06Q 30/00* (2012.01)
*G06N 3/04* (2006.01)

(52) U.S. Cl.
CPC ............. *G06N 3/08* (2013.01); *G06N 3/0472* (2013.01); *G06Q 10/063112* (2013.01); *G06Q 10/063118* (2013.01); *G06Q 30/016* (2013.01)

(58) Field of Classification Search
CPC .................. G06N 3/08; G06N 3/0472; G06Q 10/063112; G06Q 30/016; G06Q 10/063118
USPC .......................................................... 706/16
See application file for complete search history.

(56) References Cited

U.S. PATENT DOCUMENTS

| 6,389,400 B1 * | 5/2002 | Bushey .......... G06Q 10/063112 |
| | | 705/7.14 |
| 6,430,305 B1 | 8/2002 | Decker |
| 6,529,866 B1 | 3/2003 | Cope et al. |
| 6,839,682 B1 | 1/2005 | Blume et al. |
| 6,915,254 B1 | 7/2005 | Heinze et al. |
| 6,981,040 B1 | 12/2005 | Konig et al. |
| 7,158,959 B1 | 1/2007 | Chickering et al. |

(Continued)

OTHER PUBLICATIONS

Williams et al., "Hybrid Code Networks: practical and efficient end-to-end dialog control with supervised and reinforcement learning" Apr. 24, 2017. (Year: 2017).*

(Continued)

*Primary Examiner* — Miranda M Huang
*Assistant Examiner* — Chase P. Hinckley
(74) *Attorney, Agent, or Firm* — GTC Law Group PC & Affiliates

(57) ABSTRACT

Users may request assistance or information from a limited number of resources, such as submitting a user request by speaking or entering text. A user request from among the pending user requests may be selected using a selection model. A selection model may process features relating to each of the pending user requests and generate a probability distribution for the pending user requests. A user request may then be selected using the probability distribution, such as by making a random selection. The selection model may be updated over multiple time periods by computing reward scores for the selection decisions made by the selection model and using the reward scores to update the parameters of the selection model.

18 Claims, 5 Drawing Sheets

(56) References Cited

U.S. PATENT DOCUMENTS

| | | | |
|---|---|---|---|
| 7,472,096 B2 * | 12/2008 | Burges | G06N 3/08 |
| | | | 706/20 |
| 7,565,372 B2 | 7/2009 | Zhang et al. | |
| 7,644,057 B2 | 1/2010 | Nelken et al. | |
| 7,809,601 B2 | 10/2010 | Shaya et al. | |
| 7,936,867 B1 * | 5/2011 | Hill | H04M 3/5233 |
| | | | 379/265.09 |
| 8,046,254 B2 * | 10/2011 | Kosiba | G06Q 10/04 |
| | | | 705/7.38 |
| 8,156,138 B2 | 4/2012 | Kohn et al. | |
| 8,429,098 B1 | 4/2013 | Pawar et al. | |
| 8,527,310 B1 * | 9/2013 | Capetz | G06Q 30/01 |
| | | | 705/7.11 |
| 8,577,671 B1 | 11/2013 | Barve et al. | |
| 8,595,089 B1 | 11/2013 | Roberts | |
| 8,612,272 B1 | 12/2013 | Aykin | |
| 8,626,509 B2 | 1/2014 | Roy et al. | |
| 8,700,640 B2 | 4/2014 | Shivashankar et al. | |
| 8,781,873 B2 * | 7/2014 | Purohit | G06Q 10/06375 |
| | | | 705/7.18 |
| 9,336,269 B1 | 5/2016 | Smith et al. | |
| 9,497,243 B1 * | 11/2016 | Binns | H04L 65/602 |
| 9,635,177 B1 * | 4/2017 | Hoffberg | H04M 3/5175 |
| 9,648,171 B1 * | 5/2017 | Eftekhari | H04M 3/5232 |
| 9,762,733 B1 * | 9/2017 | Ramanujaiaha | H04M 3/5183 |
| 9,774,737 B2 * | 9/2017 | Surridge | G06Q 10/063112 |
| 9,785,715 B1 * | 10/2017 | Busey | G06N 5/003 |
| 9,990,636 B1 * | 6/2018 | Lewis | G06Q 30/016 |
| 10,142,222 B1 * | 11/2018 | Zhang | H04L 45/308 |
| 10,171,671 B1 * | 1/2019 | Prasad | H04M 3/5235 |
| 10,200,334 B1 * | 2/2019 | Cordell | H04L 67/26 |
| 10,235,630 B1 * | 3/2019 | Wu | G06N 7/005 |
| 10,380,498 B1 * | 8/2019 | Chaoji | G06N 20/00 |
| 10,382,370 B1 * | 8/2019 | Labarre | H04L 51/04 |
| 10,417,345 B1 * | 9/2019 | Carlson | G06F 16/638 |
| 10,447,855 B1 * | 10/2019 | Hoffberg | H04M 3/5175 |
| 10,489,866 B2 * | 11/2019 | Gaedcke | G06Q 30/0207 |
| 2002/0161664 A1 | 10/2002 | Shaya et al. | |
| 2003/0033194 A1 | 2/2003 | Ferguson et al. | |
| 2003/0033288 A1 | 2/2003 | Shanahan et al. | |
| 2003/0105655 A1 | 6/2003 | Kimbrel et al. | |
| 2003/0130899 A1 | 7/2003 | Ferguson et al. | |
| 2003/0149603 A1 | 8/2003 | Ferguson et al. | |
| 2003/0225786 A1 | 12/2003 | Hall et al. | |
| 2005/0071223 A1 | 3/2005 | Jain et al. | |
| 2005/0105712 A1 | 5/2005 | Williams et al. | |
| 2005/0228790 A1 | 10/2005 | Ronnewinkel et al. | |
| 2006/0093123 A1 * | 5/2006 | Becerra | H04M 3/5166 |
| | | | 379/265.01 |
| 2006/0112127 A1 | 5/2006 | Krause et al. | |
| 2006/0116912 A1 | 6/2006 | Maes et al. | |
| 2006/0155538 A1 | 7/2006 | Higgins et al. | |
| 2006/0200333 A1 | 9/2006 | Dalal et al. | |
| 2007/0094217 A1 | 4/2007 | Ronnewinkel et al. | |
| 2007/0100618 A1 | 5/2007 | Lee et al. | |
| 2007/0156501 A1 | 7/2007 | Ogle et al. | |
| 2007/0168448 A1 | 7/2007 | Garbow et al. | |
| 2008/0086493 A1 | 4/2008 | Zhu | |
| 2008/0091435 A1 | 4/2008 | Strope et al. | |
| 2008/0095355 A1 * | 4/2008 | Mahalaha | H04M 3/5233 |
| | | | 379/265.09 |
| 2008/0126094 A1 | 5/2008 | Janke et al. | |
| 2008/0168070 A1 | 7/2008 | Naphade et al. | |
| 2008/0249832 A1 | 10/2008 | Richardson et al. | |
| 2008/0312979 A1 | 12/2008 | Lee et al. | |
| 2008/0312980 A1 | 12/2008 | Boulineau et al. | |
| 2008/0313008 A1 | 12/2008 | Lee et al. | |
| 2009/0190743 A1 * | 7/2009 | Spottiswoode | H04M 3/5233 |
| | | | 379/265.11 |
| 2009/0222313 A1 * | 9/2009 | Kannan | G06Q 30/02 |
| | | | 705/7.31 |
| 2009/0245500 A1 * | 10/2009 | Wampler | H04M 3/42382 |
| | | | 379/265.09 |
| 2009/0307049 A1 | 12/2009 | Elliott, Jr. et al. | |
| 2010/0111285 A1 * | 5/2010 | Chishti | H04M 3/5232 |
| | | | 379/265.11 |
| 2010/0124325 A1 * | 5/2010 | Weng | G10L 15/22 |
| | | | 379/265.11 |
| 2010/0138282 A1 * | 6/2010 | Kannan | G06Q 10/06398 |
| | | | 705/7.42 |
| 2010/0153216 A1 | 6/2010 | Liang et al. | |
| 2010/0183138 A1 * | 7/2010 | Spottiswoode | H04M 3/5237 |
| | | | 379/265.11 |
| 2010/0198598 A1 | 8/2010 | Herbig et al. | |
| 2010/0250296 A1 | 9/2010 | Channabasavaiah et al. | |
| 2010/0274618 A1 * | 10/2010 | Byrd | G06Q 10/10 |
| | | | 704/275 |
| 2010/0280979 A1 | 11/2010 | Raaijmakers et al. | |
| 2011/0004506 A1 | 1/2011 | May et al. | |
| 2011/0016067 A1 | 1/2011 | Levchuk et al. | |
| 2011/0047002 A1 | 2/2011 | Flockhart et al. | |
| 2011/0082825 A1 | 4/2011 | Sathish et al. | |
| 2011/0093331 A1 | 4/2011 | Metzler et al. | |
| 2011/0138255 A1 | 6/2011 | Lee | |
| 2011/0145068 A1 | 6/2011 | King et al. | |
| 2011/0173037 A1 | 7/2011 | Attenberg et al. | |
| 2011/0184817 A1 | 7/2011 | Yankov et al. | |
| 2011/0231241 A1 | 9/2011 | Kesari et al. | |
| 2011/0286592 A1 * | 11/2011 | Nimmagadda | H04M 3/5238 |
| | | | 379/266.06 |
| 2011/0307294 A1 | 12/2011 | Barkai et al. | |
| 2011/0314012 A1 | 12/2011 | Kenthapadi et al. | |
| 2012/0005515 A1 | 1/2012 | Reddi et al. | |
| 2012/0022939 A1 * | 1/2012 | Tiwari | G06Q 30/02 |
| | | | 705/14.43 |
| 2012/0053945 A1 | 3/2012 | Gupta et al. | |
| 2012/0053984 A1 | 3/2012 | Mannar et al. | |
| 2012/0101865 A1 * | 4/2012 | Zhakov | G06Q 10/06398 |
| | | | 705/7.13 |
| 2012/0116915 A1 | 5/2012 | Zheng | |
| 2012/0130771 A1 * | 5/2012 | Kannan | G06Q 10/06398 |
| | | | 705/7.32 |
| 2012/0150626 A1 | 6/2012 | Zhang et al. | |
| 2012/0166291 A1 | 6/2012 | Broder et al. | |
| 2012/0185544 A1 * | 7/2012 | Chang | G06Q 50/01 |
| | | | 709/206 |
| 2012/0296776 A1 | 11/2012 | Kalai et al. | |
| 2012/0296900 A1 | 11/2012 | Kalai et al. | |
| 2012/0303412 A1 | 11/2012 | Etzioni et al. | |
| 2013/0014008 A1 | 1/2013 | Damera-Venkata | |
| 2013/0027561 A1 | 1/2013 | Lee et al. | |
| 2013/0034246 A1 * | 2/2013 | Kano | H04R 3/12 |
| | | | 381/107 |
| 2013/0036062 A1 * | 2/2013 | Natarajan | G06Q 10/00 |
| | | | 705/304 |
| 2013/0085837 A1 | 4/2013 | Blume | |
| 2013/0110750 A1 * | 5/2013 | Newnham | G06N 20/00 |
| | | | 706/12 |
| 2013/0111488 A1 * | 5/2013 | Gatti | G06Q 10/06 |
| | | | 718/103 |
| 2013/0144715 A1 | 6/2013 | Kranzley et al. | |
| 2013/0166485 A1 | 6/2013 | Hoffmann et al. | |
| 2013/0262168 A1 * | 10/2013 | Makanawala | H04L 51/32 |
| | | | 705/7.14 |
| 2013/0282430 A1 | 10/2013 | Kannan et al. | |
| 2013/0282595 A1 | 10/2013 | Vijayaraghavan et al. | |
| 2013/0317808 A1 | 11/2013 | Kruel et al. | |
| 2014/0067361 A1 | 3/2014 | Nikoulina et al. | |
| 2014/0075004 A1 | 3/2014 | Van Dusen et al. | |
| 2014/0089040 A1 * | 3/2014 | Nandan | G06Q 30/02 |
| | | | 705/7.28 |
| 2014/0180760 A1 | 6/2014 | Karatzoglou | |
| 2014/0270108 A1 * | 9/2014 | Riahi | H04M 3/4936 |
| | | | 379/88.01 |
| 2014/0270146 A1 * | 9/2014 | Riahi | H04M 3/4936 |
| | | | 379/265.13 |
| 2014/0297268 A1 * | 10/2014 | Govrin | G06Q 40/02 |
| | | | 704/9 |
| 2014/0297281 A1 | 10/2014 | Togawa et al. | |
| 2014/0317030 A1 * | 10/2014 | Shen | G06N 3/006 |
| | | | 706/12 |

(56) References Cited

U.S. PATENT DOCUMENTS

| | | | |
|---|---|---|---|
| 2015/0006143 A1 | 1/2015 | Skiba et al. | |
| 2015/0032724 A1 | 1/2015 | Thirugnanasundaram et al. | |
| 2015/0052002 A1 | 2/2015 | Welch et al. | |
| 2015/0055772 A1* | 2/2015 | Klemm | H04M 3/5233 379/265.12 |
| 2015/0086004 A1* | 3/2015 | Chishti | H04M 3/5232 379/265.12 |
| 2015/0095080 A1* | 4/2015 | Gatti | G06Q 10/06 705/7.14 |
| 2015/0120718 A1* | 4/2015 | Luo | G06F 16/335 707/728 |
| 2015/0142704 A1 | 5/2015 | London | |
| 2015/0201077 A1 | 7/2015 | Konig et al. | |
| 2015/0215463 A1* | 7/2015 | Shaffer | H04M 3/5232 379/265.1 |
| 2015/0228275 A1 | 8/2015 | Watanabe et al. | |
| 2015/0262188 A1* | 9/2015 | Franco | G06Q 30/016 705/7.21 |
| 2015/0293910 A1 | 10/2015 | Mathur et al. | |
| 2015/0294097 A1 | 10/2015 | Ramachandran et al. | |
| 2015/0363393 A1 | 12/2015 | Williams et al. | |
| 2016/0092688 A1 | 3/2016 | Wolrich et al. | |
| 2016/0148136 A1 | 5/2016 | Ni et al. | |
| 2016/0163311 A1 | 6/2016 | Crook et al. | |
| 2016/0163314 A1 | 6/2016 | Fujii et al. | |
| 2016/0180151 A1 | 6/2016 | Philbin et al. | |
| 2016/0198047 A1* | 7/2016 | McCormack | H04M 3/5175 379/265.09 |
| 2016/0227035 A1* | 8/2016 | Kumar | H04M 3/5232 |
| 2016/0247068 A1 | 8/2016 | Lin | |
| 2016/0283970 A1 | 9/2016 | Ghavamzadeh et al. | |
| 2016/0306671 A1* | 10/2016 | Kadioglu | G06F 16/288 |
| 2016/0323158 A1 | 11/2016 | Hu et al. | |
| 2016/0352902 A1* | 12/2016 | Raanani | G06Q 30/02 |
| 2016/0364522 A1 | 12/2016 | Frey et al. | |
| 2017/0006161 A9* | 1/2017 | Riahi | G06Q 30/02 |
| 2017/0011279 A1 | 1/2017 | Soldevila et al. | |
| 2017/0076200 A1 | 3/2017 | Nasu et al. | |
| 2017/0111507 A1* | 4/2017 | McGann | H04M 3/5232 |
| 2017/0140280 A1* | 5/2017 | Ajmera | G06Q 10/10 |
| 2017/0155768 A1* | 6/2017 | Conway | G10L 15/1822 |
| 2017/0171580 A1* | 6/2017 | Hirsch | H04N 21/252 |
| 2017/0178012 A1 | 6/2017 | Borza et al. | |
| 2017/0243277 A1* | 8/2017 | You | G06F 16/9535 |
| 2017/0286972 A1* | 10/2017 | Hausler | G06Q 30/016 |
| 2017/0308535 A1* | 10/2017 | Agarwal | G06N 7/005 |
| 2018/0012229 A1* | 1/2018 | Roberts | G06Q 30/016 |
| 2018/0341395 A1* | 11/2018 | Yaseen | G06F 3/04847 |
| 2018/0349916 A1* | 12/2018 | Gaedcke | G06Q 30/016 |
| 2018/0365321 A1* | 12/2018 | Ke | G06F 17/211 |
| 2018/0374029 A1 | 12/2018 | Henry | |

OTHER PUBLICATIONS

Ordenes et al., "Analyzing Customer Experience Feedback Using Text Mining: A Linguistics-Based Approach" Mar. 21, 2014, Journal of Service Research, pp. 1-18. (Year: 2014).*
Liu et al., "Job Scheduling Model for Cloud Computing Based on Multi-Objective Genetic Algorithm" Jan. 2013, International Journal of Computer Science Issues, vol. 10, Iss 1, No. 3, pp. 134-139. (Year: 2013).*
Liu et al., "Cost-Aware Cloud Service Request Scheduling for SaaS Providers" Feb. 5, 2013, pp. 291-301. (Year: 2013).*
"Scikit-learn Machine Learning in Python", scikit-learn 0.17.1 documentation, http://scikit-learn.org/stable/ (accessed on Sep. 20, 2016), 3 pages.
Al-Rfou, et al., "Conversational Contextual Cues: The Case of Personalization and History for Response Ranking", CoRR abs/ 1606.00372, http://arxiv.org/abs/1606.00372, 2016, 10 pages.
Bahdanau, et al., "Neural Machine Translation by Jointly Learning to Align and Translate", CoRR abs/1409.0473, http://arxiv.org/abs/ 1409.0473, May 19, 2016, 15 pages.
Bengio, et al., "A Neural Probabilistic Language Model", Journal of Machine Learning Research, vol. 3 accessed at http://www.jmlr. org/papers/volume3/bengio03a/bengio03a.pdf, 2003 (accessed on Jan. 3, 2017), pp. 1137-1155.
Brown, et al., "Class-Based n-gram Models of Natural Language", Computational Linguistics, vol. 18, No. 4, accessed at http://aclweb. org/anthology/J/J92/J92-4003.pdf, 1992, pp. 467-479 (accessed on Jan. 3, 2017).
Carrier, et al., "LSTM Networks for Sentiment Analysis", http:// deeplearning.net/tutorial/lstm.html, accessed on Sep. 20, 2016, 5 pages.
Chen, et al., "An empirical investigation of sparse log-linear models for improved dialogue act classification", 2013 IEEE International Conference on Acoustics. Speech and Signal Processing. IEEE, 2013, 6 pages.
Chen, "An empirical investigation of sparse log-linear models for improved dialogue act classification.", 2013 IEEE International Conference on Acoustics, Speech and Signal Processing. IEEE, 2013, pp. 1-6.
Courbariaux, et al., "BinaryConnect: Training Deep Neural Networks with binary weights during propagations", CoRR, accessed at https://arxiv.org/pdf/1511.00363v3.pdf, 2015 (Jan. 3, 2017), 9 pages.
De Boer, et al., "A Tutorial on the Cross-Entropy Method", Annals of Operations Research, vol. 134, https://people.smp.uq.edu.au/ DirkKroese/ps/aortut.pdf (accessed on Jul. 7, 2017), 2005, pp. 19-67.
Gong, et al., "Iterative Quantization: A Procrustean Approach to Learning Binary Codes", CVPR 2011, accessed at http://www.cs. unc.edu/~lazebnik/publications/cvpr11_small_code.pdf, 2011 (accessed on Jan. 3, 2017), pp. 317-824.
Hochreitner, et al., "Long Short-Term Memory", Neural Computation, vol. 9, Iss. 8, accessed at http://deeplearning.cs.cmu.edu/pdfs/ Hochreiter97_lstm.pdf, 1997 (accessed on Jan. 3, 2017), pp. 1735-1780.
Ji, et al., "An Information Retrieval Approach to Short Text Conversation", CoRR, accessed at https://arxiv.org/pdf/1408.6988v1. pdf, Aug. 29, 2014 (accessed on Jan. 3, 2017), 21 pages.
Joachims, "Text Categorization with Support Vector Machines: Learning with Many Relevant Features", Machine Learning: ECML-98, Lecture Notes in Computer Science (Lecture Notes in Artificial Intelligence), vol. 1398. Springer, Berlin, Heidelberg, Nédellec C., Rouveirol C. (eds), https://www.cs.cornell.edu/people/tj/publications/ joachims_98a.pdf, 1998, 7 pages, (accessed Jul. 7, 2017).
Karpathy, "Deep Reinforcement Learning: Pong from Pixels", Andrej Karpathy Blog, http://karpathy.github.io/2016/05/31/rl/ (accessed on Jul. 7, 2017), May 31, 2016, 34 pages.
Karpathy, "The Unreasonable Effectiveness of Recurrent Neural Networks", http://karpathy.github.io/2015/05/21/rnn-effectiveness/, (accessed on Sep. 20, 2016), May 21, 2015, 42 pages.
Kim, et al., "Character-Aware Neural Language Models", CoRR abs/1508.06615, http://arxiv.org/abs/1508.06615, 2015, 9 pages.
Kim, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Lai et al., "Recurrent Convolutional Neural Networks for Text Classification", AAAI'15 Proceedings of the Twenty-Ninth AAAI Conference on Artificial Intelligence, 2015, pp. 2267-2273.
Lai, et al., "Simultaneous Feature Learning and Hash Coding with Deep Neural Networks", CoRR, accessed at http://www.cv-foundation. org/openaccess/content_cvpr _2015/papers/Lai_Simultaneous_ Feature_Learning_2015_CVPR_paper.pdf, 2015 (accessed Jan. 3, 2017), pp. 3270-3278.
Larochelle, et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Lee, et al., "Robust Dialog Management with N-best Hypotheses Using Dialog Examples and Agenda", Proceedings of ACL-08: HLT, Columbus, Ohio, Jun. 2008, pp. 630-637.
Levy, et al., "Neural Word Embedding as Implicit Matrix Factorization", Advances in Neural Information Processing Systems 27: Annual Conference on Neural Information Processing Systems

(56) References Cited

OTHER PUBLICATIONS

2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp. 1106-1115.

Miao, et al., "Neural Variational Inference for Text Processing", CoRR abs/1511.06038, http://arxiv.org/abs/1511.06038, 2015, 15 pages.

Mikolov, et al., "Distributed Representations of Words and Phrases and their Compositionality", CoRR abs/1310.4546, http://arxiv.org/abs/1310.4546, 2013, 9 pages.

Mikolov, et al., "Distributed Representations ofWords and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, et al., "Recurrent neural network based language model", Interspeech 2010, Sep. 26-30, 2010, Makuhari, Chiba, Japan, 2010, pp. 1045-1048.

Mikolov, et al., "Recurrent neural network based language model", Interspeech 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.

PCT/US2016/049896, "Application Serial No. PCT/US2016/049896, International Search Report and the Written opinion dated May 19, 2017", 14 pages.

Rush, et al., "Optimal Beam Search for Machine Translation", Proceedings of EMNLP 2013, Oct. 18-21, 2013, Seattle, Washington, USA, 2013, 12 pages.

Shi, et al., "Contextual spoken language understanding using recurrent neural networks.", 2015 IEEE International Conference on Acoustics, Speech and Signal Processing (ICASSP). IEEE, 2015, pp. 5271-5275.

Sutskever, et al., "Sequence to Sequence Learning with Neural Networks", CoRR abs/1409.3215, http://arxiv.org/abs/1409.3215, 2014, 9 pages.

Tai, et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Vinyals, et al., "A Neural Conversational Model", CoRR abs/1506.05869, http://arxiv.org/abs/1506.05869, 2015, 8 pages.

Wang, et al., "Baselines and Bigrams: Simple, Good Sentiment and Topic Classification", Proceedings of the 50th Annual Meeting of the Association for Computational Linguistics: Short Papers, vol. 2, Association for Computational Linguistics, https://nlp.stanford.edu/pubs/sidaw12_simple_sentiment.pdf (accessed on Jul. 7, 2017), 2012, pp. 90-94.

Williams, "Simple Statistical Gradient-Following Algorithms for Connectionist Retirement Learning", Machine Learning, vol. 8, http://www-anw.cs.umass.edu/~barto/courses/cs687/williams92simple.pdf (accessed on Jul. 7, 2017), 1992, pp. 229-256.

Zhang, et al., "Character-level Convolutional Networks for Text Classification", CoRR abs/1509.01626, http://arxiv.org/abs/1509.01626, 2015, 9 pages.

* cited by examiner

USING A NEURAL NETWORK TO OPTIMIZE PROCESSING OF USER REQUESTS

CLAIM OF PRIORITY

The present application is a continuation-in-part of U.S. patent application Ser. No. 15/634,733, filed on 27 Jun. 2017, and entitled "SELECTION OF CUSTOMER SERVICE REQUESTS". The Ser. No. 15/634,733 application is incorporated herein by reference in its entirety for all purposes.

FIELD OF THE INVENTION

The present invention relates to using a neural network to optimize processing of user requests.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative.

Some existing techniques for the ordering of servicing customer requests may result in undesirable outcomes, such as when a customer's request is for an urgent matter, when a customer has a recurring issue, when a customer has a high priority status, and the like. As such, selection based on simple selection models such as on a first-come-first-serve basis may provide a lower overall quality of service, and lower customer satisfaction for services provided by the company. Therefore, improved techniques for selecting customer requests for processing by customer service representatives are required.

BRIEF DESCRIPTION OF THE FIGURES

The invention and the following detailed description of certain embodiments thereof may be understood by reference to the following figures.

DETAILED DESCRIPTION

Described herein are techniques for optimizing selection of an incoming request for processing from among requests received from a plurality of users. Although the techniques described herein may be used for a wide variety of users and requests, for clarity of presentation, an example of a company selecting a customer request from a plurality of customer requests will be used. The techniques described herein, however, are not limited to customers and companies, the requests may be from users who are not customers, and the selection may be performed by a third party on behalf of another company.

The present disclosure improves the overall performance of responding to requests of customers seeking customer support from a company through the selection and assignment of requests to customer service representatives. The process is improved by using a mathematical model to select customer requests where the mathematical model is updated over multiple time periods using a computed performance of the model over each of the time periods. The model may select customer requests using different types of input data, such as the customer wait time, the type of request, characteristics of the available customer service representative, and the like. The overall performance may be improved because the automated computer-based selection system may prioritize customer requests to improve a performance measure, such as customer satisfaction or a rate of processing customer requests.

In the non-limiting example of a customer service system (e.g., via telephone, text, email, and the like), when many customers are requesting service from a limited number of customer service representatives (CSRs), there needs to be a process in place for determining which customer request is serviced by the next available customer service representative. A first-come-first-serve method may be the most direct way of making such a determination, but in its simplicity, it lacks the ability to consider other pertinent factors that may lead to an improved overall performance, such as customer satisfaction and/or customer response rate. For instance, considering the urgency of a request (e.g., a situation that puts a customer at risk for harm, such as a downed electrical wire) in making a selection decision may improve the performance of the system. Although urgency may be one of the more clearly understood factors for determining the selection, considering other factors may lead to improved customer service performance.

Figure 1:
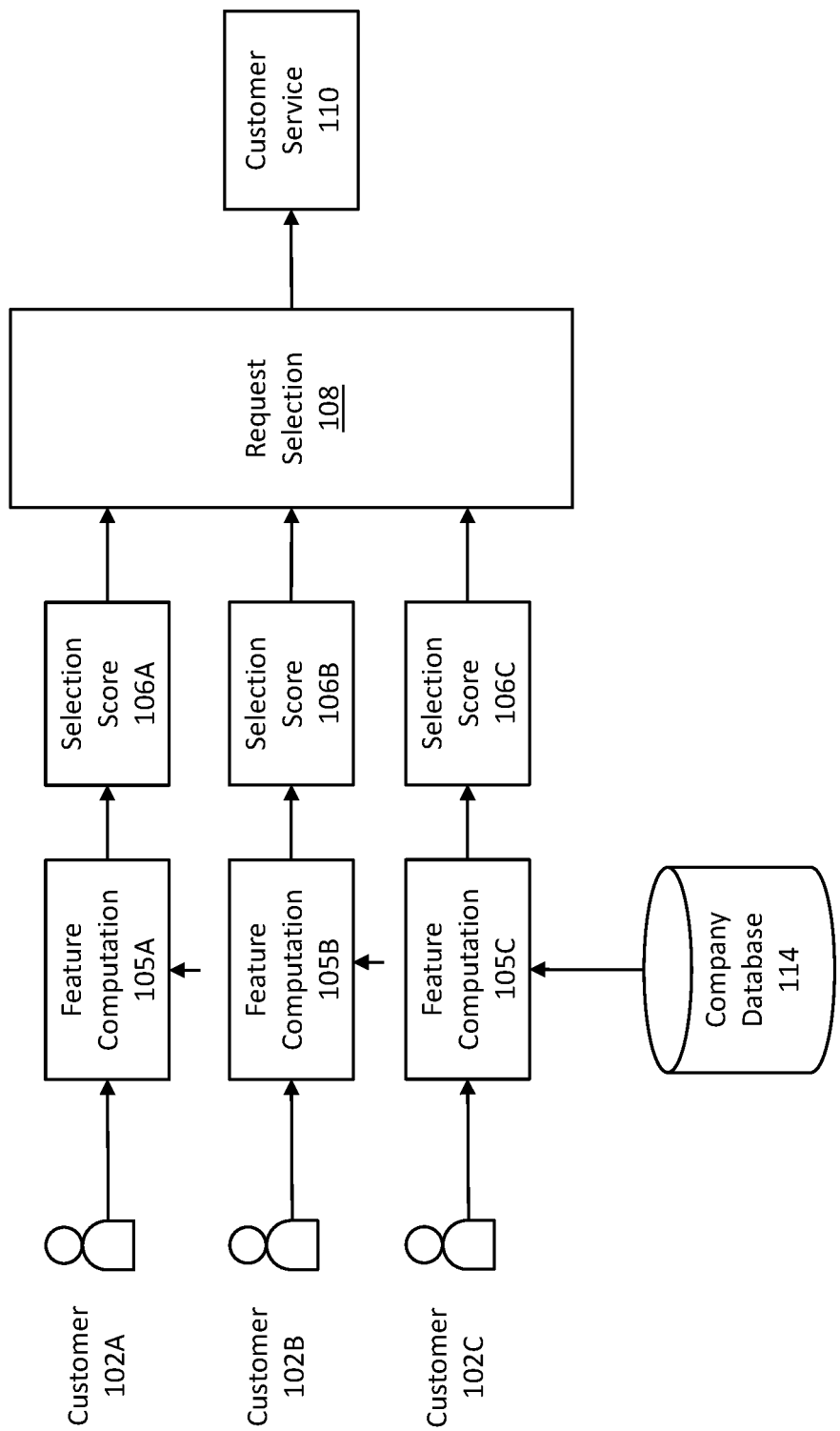
FIG. 1 illustrates a system for selecting a customer request from a plurality of customer requests in a customer service application.

FIG. 1 illustrates a system for selecting a customer request, where a plurality of customers 102A-C make requests (e.g., through a telecommunication or Internet communication channel using voice, or telephone, text message, email, and the like) to a company for customer service. A customer service representative may become available to process a request, and a request from one of customers 102A-C may be selected for assignment to that customer service representative. Feature computation components 105A-C receive the requests along with information about the customers 102A-C and/or the available customer service representative, such as through the request and/or from a company database 114. Feature computation components 105A-C may compute features relating to the requests, such as a feature vector for each request. Selection score components 106A-C receive the features for the requests and compute a selection score for each of the corresponding customer requests. Request selection component 108 then receives each of the selection scores and selects one of the requests using the scores, such as by selecting a request having a highest score. For instance, the request from customer 102B may be selected from among the requests from customers 102A, 102B, and 102C. Customer service component 110 may receive information about the selected customer request and perform any additional processing to assist in responding to the selected request, such as by starting a communications session between the customer and the customer service representative.

The present disclosure describes an automated customer request selection method and system that is adapted to improve the performance of processing customer requests. The customer request selection method and system may include feature extraction (e.g., from customer requests, stored customer information, stored customer service representative information), computing performance and reward scores (e.g., customer satisfaction ratings, customer handling rate, combining multiple reward scores), training a selection model (e.g., a linear model or neural network model), and the like.

Feature Extraction

Customer Request Features

When a customer contacts a company (e.g., via phone or text message), the customer may provide a description of the issue for which they want to receive customer service, called a customer request. Features may be obtained or computed that relate to the customer request, such as wait time, a category of the request, a sentiment expressed in the request, the urgency of the request, and the like.

Wait time may be associated with the initial time of the customer's request. When the customer contacts the company, the customer is assigned to a queue, which records the time the customer was placed in the queue. When a customer service representative becomes available, the length of time the customer has been waiting can be computed. The wait time may be a feature, such as a number of seconds since the request was received.

The customer request may be classified by a category model into one of a number of categories, for example, billing or tech support. The request may be classified using a feature extractor which extracts features from the text of the customer request and a category model which performs the classification. For example, the feature extractor could extract word n-grams from the text and the category model could be a support vector machine, logistic regression classifier or multi-layer perceptron, or the feature extractor could extract a matrix of word embeddings and the category model could be a convolution or recurrent neural network. This category model may be trained, for example, on data from the company database that has been annotated by human experts. The output of the category model may be, for example, a one-of-k vector (where one element of the vector is true or 1 and the remaining values are false or 0) indicating which category the request belongs to (of k possible categories).

The customer request may be classified by a sentiment model into one of a number of possible sentiment levels, for example, on a scale from 1 to 5, where 1 indicates that the customer is angry and 5 indicates that the customer is happy. The sentiment may be determined using a feature extractor which extracts features from the text of the customer request and a sentiment model which performs the classification. For example, the feature extractor could extract word n-grams from the text and the sentiment model could be a support vector machine, logistic regression classifier or multi-layer perceptron, or the feature extractor could extract a matrix of word embeddings and the sentiment model could be a convolution or recurrent neural network. This sentiment model may be trained, for example, on data from the company database that has been annotated by human experts. The output of the sentiment model may be, for example, a one-of-k vector indicating which sentiment level (of k possible sentiment levels) the request belongs to.

The customer request may be classified by an urgency model into one of a number of possible urgency levels, for example, on a scale from 1 to 5 where 1 indicates that the customer request is not urgent and 5 indicates the customer request is very urgent. The urgency level may be determined using a feature extractor which extracts features from the text of the customer request and an urgency model which performs the classification. For example, the feature extractor could extract word n-grams from the text and the urgency model could be a support vector machine, logistic regression classifier or multi-layer perceptron, or the feature extractor could extract a matrix of word embeddings and the urgency model could be a convolution or recurrent neural network. This urgency model may be trained, for example, on data from the company database that has been annotated by human experts.

Customer Database Features

A company may retain records of previous interactions with a customer, such as call transcripts or text conversation transcripts. The company may also retain a record of the activity on a customer account. If the company can identify the customer when the customer makes contact, it can use the identity of the customer to obtain more information about the customer and compute additional features using this information. Features may be extracted from recent customer interactions with the company, such as interactions that have taken place within a specified number of days or a specified number of most recent interactions. The features may relate to a category, sentiment, account information, and the like.

The previous customer interactions may be classified by a category model into a number of categories, for example, billing or tech support. The previous interaction may be classified using a feature extractor which extracts features from the text of the previous interaction and a category model which performs the classification. For example, the feature extractor could extract word n-grams from the text and the category model could be a support vector machine, logistic regression classifier or multi-layer perceptron, or the feature extractor could extract a matrix of word embeddings and the category model could be a convolution or recurrent neural network. This category model may be trained, for example on data from the company database that has been annotated by human experts. The output of the category model may be, for example, one-of-k vectors (where on element of the vector is true or 1 and the remaining values are false or 0) indicating which category the previous interactions belong to.

The previous customer interactions may be classified by a sentiment model into one of a number of possible sentiment levels, for example, on a scale from 1 to 5, where 1 indicates that the customer is angry and 5 indicates that the customer is happy. The sentiment may be determined using a feature extractor which extracts features from the text of the previous interaction and a sentiment model which performs the classification. For example, the feature extractor could extract word n-grams from the text and the sentiment model could be a support vector machine, logistic regression classifier or multi-layer perceptron, or the feature extractor could extract a matrix of word embeddings and the sentiment model could be a convolution or recurrent neural network. This sentiment model may be trained, for example, on data from the company database that has been annotated by human experts. The output of the sentiment model may be, for example, one-of-k vectors indicating which sentiment level each of the previous interactions belong to.

Activity on the customer account may be used to extract additional features. For example, a customer might have an overdue bill or a scheduled technician visit, each of which could be indicated by a binary feature, or a customer could use some but not all of the company's products, which could be indicated by an n-of-k vector (where the company has k products and the customer is using n of them, an n-of-k vector may have length k where n of the elements are true or 1 to indicate the products used by the customer and the remaining elements are false or 0). A customer might also be a priority customer because of the length of time they have been with the company or because they pay for special status, which could be indicated by a binary feature. The output of this feature extractor may be an n-of-k vector indicating the various account features. Indicators may take any appropriate type of value, such as boolean, integer, or real-valued.

Customer Service Representative Features

A company may retain records of previous interactions of a customer service representative with customers, such as call transcripts or text conversation transcripts. When a customer service representative becomes available, the company can use these to obtain more information about the representative, such as related to a representative's skills, sentiment of a customer or customer service representative in a message, a rating of the customer service representative by a customer, and the like.

The representative database may store information related to various skills associated with the representative. Using a category model, such as described herein, a company may identify the categories of a representative's previous interactions and use these to determine various data such as the rate at which the representative handles interactions of a particular category. For example, this could be calculated using the elapsed time of the given interaction or the length of the text transcript. A feature vector may be created as an n-of-k vector or a real-valued vector of length k that indicates the skills of the customer service representative.

The representative database may store information related to the expertise of a customer service representative. In some implementations, a customer service representative may have expertise in particular categories of requests. For example, a customer service representative may have been hired to handle technical support issues or billing issues. The expertise of the customer support representative may be stored in the representative database. A feature vector may be created as an n-of-k vector that indicates the expertise of the customer service representative.

Using a sentiment model, such as described herein, a company may identify the sentiment of customers in a representative's previous interactions and use these to determine various data such as how well the representative deals with irate customers. For example, this could be calculated using the difference between the sentiment of the customer request and the sentiment of a subsequent interaction. The output of this feature extractor is an n-of-k vector indicating the various sentiment levels of the representative's previous interactions, or a real-valued vector of length k providing a score for the representative in each level.

A company may survey customers to determine whether they were satisfied with their interaction with the company. For instance, a customer might rate their interaction on a scale from 1 to 5, with 1 indicating dissatisfaction and 5 indicating satisfaction. These scores can be aggregated to create a satisfaction rating for the representative, for example by averaging them. The output of this feature extractor is a real number indicating the representative's satisfaction score.

Figure 2:
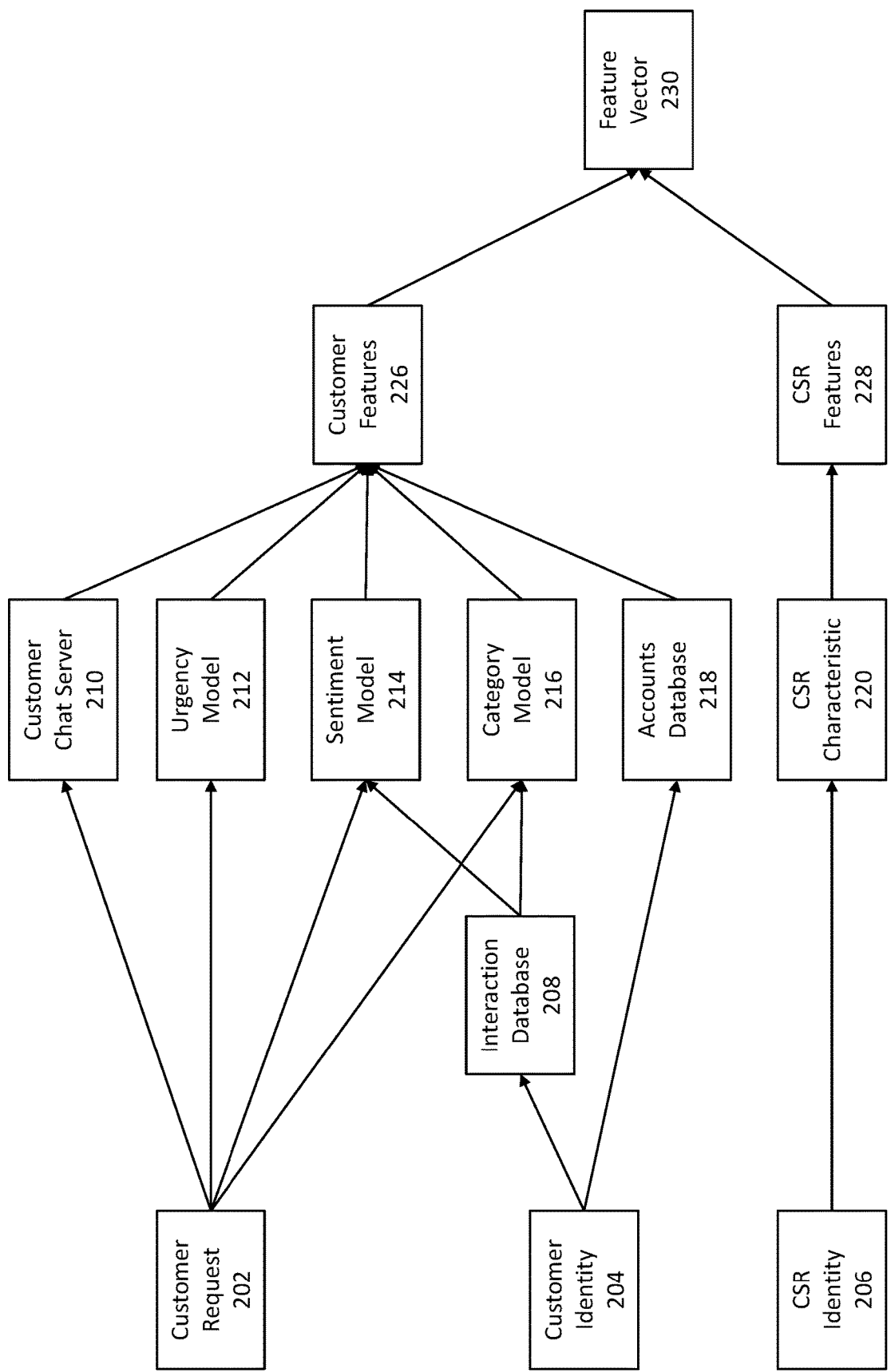
FIG. 2 illustrates a process flowchart for determining features for selecting a customer request.

FIG. 2 illustrates an embodiment process flow for collecting features for consideration in selecting a customer request, such as determined from a customer request 202, customer identity 204, customer service representative identity 206, and the like. Although FIG. 2 illustrates the determination of feature vector 230 from a customer request 202, customer identity 204, and customer service representative identity 206, in embodiments only one or more of these input sources may be considered. For example, feature vector 230 may be determined from only the customer request 202. However, in considering all three input sources 202, 204, and 206, FIG. 2 illustrates a general flow of how features may be determined from all three. For instance, the customer request 202 may be utilized by a customer chat server 210 to determine a wait time, and an urgency model 212, sentiment model 214, and category model 216 may be used to extract their corresponding features as described herein. A customer's identity 204, such as stored in an interaction database 208, may also contribute to the development of sentiment and category features from previous interactions through the sentiment model 214 and category model 216. In addition, the customer's identity 204 may also be used to access an accounts database 218, such as storing accounts information such as billing and service information. Customer features 226 may then be determined from any combination of the above features. Feature vector 230 may also include customer service representative (CSR) features 228 determined from CSR characteristics 220 obtained using the CSR identity 206, such CSR features may include features representing skills, expertise, or ability of the customer service representative to handle requests of different sentiment levels. Feature vector 230 is then utilized to compute a selection score for the request.

The features may be stored in any appropriate format and combined in any appropriate way. For example, a feature vector of customer features may be created and a feature vector of CSR features may be created. A feature vector of total features may be created by concatenating the customer feature vector and the CSR feature vector. As used herein, the term feature vector includes any format for storing features, such as a matrix of features.

Selection Model Processing

Returning to FIG. 1, feature computation components 105A-C may compute any combination of features described above for a customer request. For example, feature computation component 105A may receive a request from customer 102A and compute a feature vector, feature computation component 105B may receive a request from customer 102B and compute a feature vector, and so forth. In some implementations, feature computation components 105A-C may be the same component and used for multiple customer requests.

Selection score components 106A-C may compute a selection score for customer requests by processing a feature vector received from one of feature computation component 105A-C. Selection score components 106A-C may use any appropriate techniques for computing a selection score, such as using a linear model, a neural network, and the like. In some implementations, selection score components 106A-C may be the same component and used for multiple customer requests.

In some implementations, selection score components 106A-C may compute a score using a linear model. A linear model may be implemented with a weight vector sampled from a multivariate normal distribution with mean vector m and covariance matrix C. Where the feature vector is denoted as x, a score s may be computed as $$w \sim N(m, C)$$

$$s = w^T x$$

The vector w may be different each time a score is computed from a feature vector since w is sampled from a multivariate normal distribution.

In some implementations, selection score components 106A-C may compute a score using a neural network, such as a multi-layer perceptron (MLP) with a single hidden layer. An MLP may be specified with weight matrices $W_1$ and $W_2$, bias vectors $b_1$ and $b_2$, and non-linear function a, such as a rectified linear function or a hyperbolic tangent function. Where the feature vector is denoted by x, a score s may be computed as $$h = \sigma(W_1 x + b_1)$$

$$s = W_2 h + b_2$$

Request selection component 108 may receive selection scores from selection score components 106A-C and select a customer request for assignment to the customer service representative using the selection scores. In some implementations, request selection component 108 may select a customer request having the highest score.

In some implementations, request selection component 108 may use probabilistic techniques to select a customer request. For example, let $s_1, \ldots s_N$ be N selection scores received for N different customer requests. A discrete probability distribution may be computed from the scores, such as by using a softmax function. Denote the probability distribution as $p_1 \ldots p_N$ and each $p_j$ may be computed as $$p_j = \frac{e^{s_j}}{\sum_{k=1}^{N} e^{s_k}}$$

for j from 1 to N.

A customer request may be selected by sampling this probability distribution. A customer request with a highest score will have the highest probability of being selected, but it is possible that another customer request is selected and it is possible that a customer request with a lowest score is selected, albeit with a correspondingly lower probability.

Customer service component 110 may receive information relating to the selected customer request and perform any additional processing needed to respond to the customer request. For example, customer service component 110, may cause a customer service session to be started between the customer of the selected customer request and the customer service representative and cause information about the selected request to be sent to the customer service representative.

Selection Model Training
Overview

Figure 3:
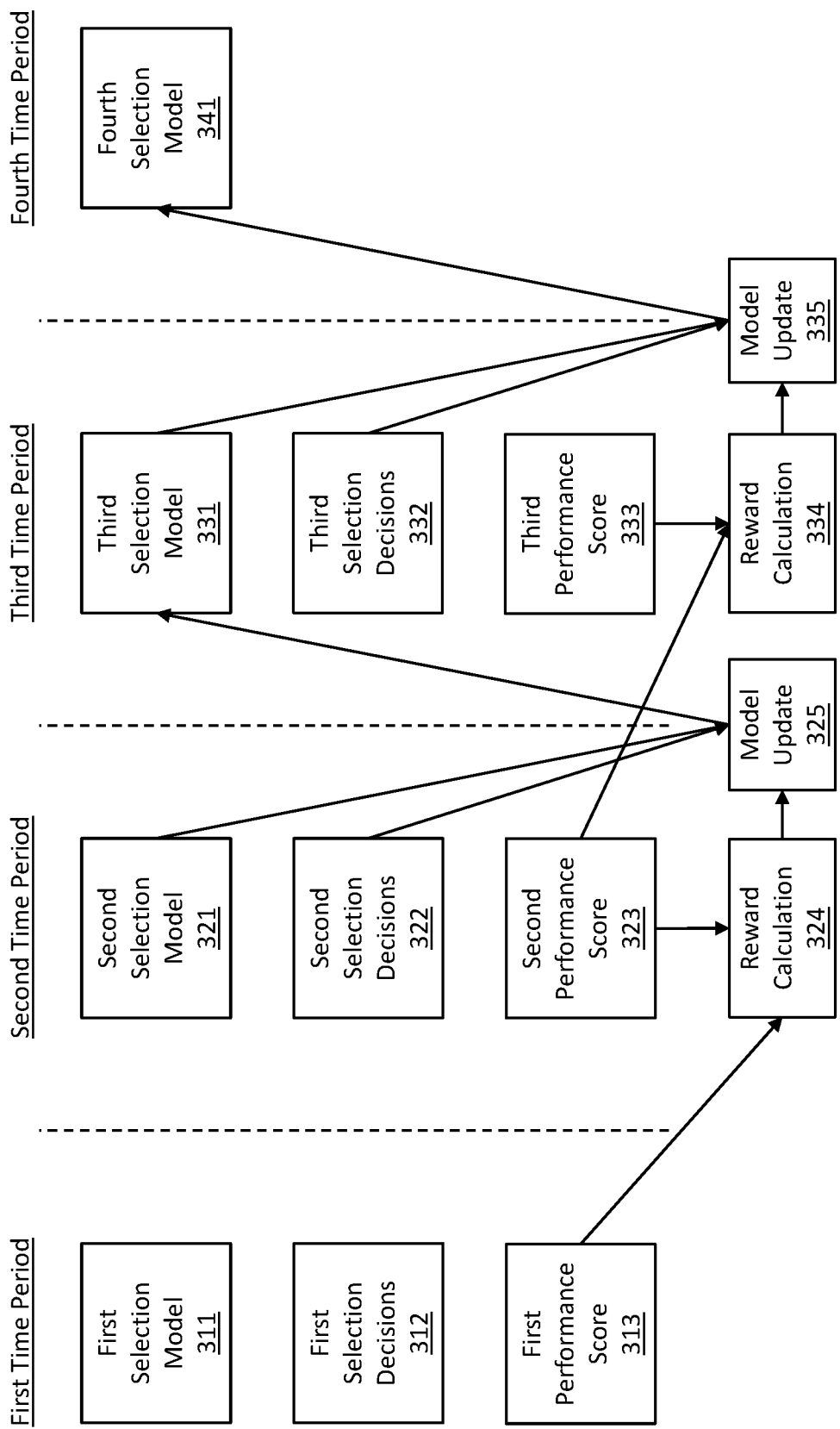
FIG. 3 illustrates a timewise process diagram for updating a selection model in a customer service system.

A customer request selection model may be trained by measuring its performance over multiple time periods, and determining if changes to the selection model have improved performance over the successive time periods. FIG. 3 illustrates an example of measuring the performance of a selection model over multiple periods and using performance scores to train the selection models for later time periods. In the example of FIG. 3, the performance of a first selection model 311 is measured over a first time period to obtain a first performance score 313, and the performance of a second selection model 312 is measured over a second time period to obtain a second performance score 323. These performance scores may be used to train a third selection model 331 that is used during a third time period.

In some implementations, the third selection model 331 may be trained by computing a reward score using reward calculation component 324. For example, the reward score may be positive if the second performance score is larger than the first performance score and negative otherwise. In some implementations, the third selection model 331 may be trained using second selection decisions 322 made by the second selection model 321 during the second time period. The second selection decisions 322 may include any relevant information about selection decisions made during the second time period. For example, a selection decision may include information about customer requests awaiting assignment to a customer service representative, the customer service representative available to be assigned to a customer request, the customer request that was selected to be assigned to the available customer service representative, and any information about how the selection was made, such as selection scores computed for the customer requests.

In some implementations, model update component 325 may receive as input the second selection model 321, the second selection decisions 322, and a reward score. Model update component 325 may process these inputs and modify parameters of the second selection model 321 to generate a third selection model 331. This process may be repeated for additional time periods to compute a fourth selection model 341, and so forth. Further details of example implementations are described below.

Performance Scores

Companies may have performance scores by which they measure the performance of their customer service representatives. Companies may want to optimize the way they assign customer requests to available customer service representatives with respect to these scores. The performance score may be computed once per time period for instance, such as once an hour, once a day, or once a week. Performance scores that a company may want to optimize may include customer satisfaction, customer handling rate, and the like. A customer satisfaction rating may be obtained, for instance, where a company surveys customers to determine whether they were satisfied with their interaction with the company. For example, a customer might rate their interaction on a scale from 1 to 5, with 1 indicating dissatisfaction and 5 indicating satisfaction. Individual customer satisfaction ratings may be combined to get a value representative of the overall time period, such as by computing an average satisfaction score over the whole time period. A customer handling rate may be obtained where a company records, for instance, the number of customer requests handled in given amount of time, for example, the number of customer requests handled per hour.

A performance score may correspond to an entire time period. For example, a performance score for time period i may be denoted as $P_i$, such as an average customer rating during the time period or a customer handling rate for the time period.

A performance score may be computed using multiple selection decisions that were made during a time period, such as two or more selections during the time period. For example, a performance score for time period i may be denoted as $P_i$, such as an average customer rating of two or more selection decisions during the time period.

A performance score may also apply to an individual selection decision, and a performance score for an individual selection decision d during time period i may be denoted as $P_i^d$.

Reward Score

The selection model may be updated using reinforcement learning. Reinforcement learning may use a reward score that indicates how well the model is performing. The reward score may be computed once per time period, and may use the performance score of the previous time period (or other time periods) as well as the performance score of the current time period.

Computing the reward score may be implemented in a number of ways. In some implementations, the reward score $R_i$ for time period i may be equal to the performance score $R_i = P_i$, such as a when the performance score is an average rating of customers. In some implementations, the reward score $R_1$ may be computed as the difference between the performance score in the current time period and the performance score in the previous time period $R_i = P_i - P_{i-1}$, such as when the performance score is a rate of processing customer requests. In this example, the reward score will be positive when the rate of processing customer requests in the current time period is greater than the rate of the previous time period and negative otherwise.

A reward score may correspond to an entire time period, such as when the reward score is computed from one or more performance scores and the performance scores correspond to an entire time period as described above. In some implementations, a reward score may be computed using multiple selection decisions, such as when the reward score is computed using one or more performance scores and the performance scores were computed using multiple selection decisions as described above.

In some implementations, a reward score may be computed for each selection decision. For example, a selection decision may select a customer request for assignment to the customer service representative, and a rating received from the customer corresponding to that customer request may be used as the reward score for that selection decision. A reward score for selection decision d of time period i may be denoted as $R_i^d$.

A selection decision at one time instance may also impact the customers who were not selected at that selection decision. Accordingly, improved performance may be obtained by computing a reward score for a selection decision using information relating to later selection decisions, such as customer ratings received for later selection decisions.

In some implementations, the reward score for a selection decision d may be a discounted reward score that is computed using a reward score for the current selection decision and one or more future selection decisions. For example, a discounted reward score for selection decision d during time period i may be denoted as $\tilde{R}_i^d$ and computed as $$\tilde{R}_i^d = \sum_{t=0}^{N} \gamma^t R_i^{d+t}$$

where N is the number of future selection decisions used, y is a number between 0 and 1 and $R_i^{d+t}$ is the reward score for the selection decision t steps in the future. The discounted reward takes into account the effects of decision d on future reward scores $R_i^{d+t}$ with less weight the further t is in the future.

In some implementations, the reward scores may be normalized. For example, by subtracting the mean of reward scores for the time period and dividing by the standard deviation of reward scores for the time period. Let $\tilde{R}_i^d$ indicate a normalized reward score that may be computed as:

$$\mu_i = \frac{1}{D}\sum_{d=1}^{D} R_i^d$$

$$\sigma_i^2 = \frac{1}{D}\sum_{d=1}^{D} (R_i^d - \mu_i)^2$$

$$\hat{R}_i^d = \frac{R_i^d - \mu_i}{\sigma_i}$$

where D is the number of selection decisions during the time period.

In some implementations, a company might want to update a selection model using multiple reward scores. A first reward score $R_{i,1}$ and a second reward score $R_{i,2}$ may be computed for time period i. For example, the first reward score may correspond to customer ratings and the second reward score may correspond to a rate of processing customer requests. In some implementations, the reward scores may be computed using performance scores. For example, reward score $R_{i,1}$ may be computed using performance score $P_{i,1}$ (or using $P_{i,1}$ and $P_{i-1,1}$) and $R_{i,2}$ may be computed using performance score $P_{i,2}$ (or using $P_{i,2}$ and $P_{i-1,2}$). A total reward score for time period i may be computed as $$R_i = \alpha_1 R_{i,1} + \alpha_2 R_{i,2}$$

where $\alpha_1$ and $\alpha_2$ are weights indicating the relative importance of each reward score, and the weights sum to 1. Any number of reward scores may be used in a similar manner.

Model Training

The selection model may be trained using any appropriate algorithm. In some implementations, the selection model may be trained using a reinforcement learning algorithm, such as a cross entropy method, a policy gradient method, and the like. For example, using the cross entropy method, if the selection model is a linear model with weights sampled from a multivariate normal distribution with mean m and covariance matrix C, the model can be updated with the following steps where the steps may be applied to each selection decision made during the time period.

Suppose that time step i had D selection decisions. For each selection decision, a number of customer requests were pending and one of the customer requests was selected. Denote the number of customer requests pending during each selection decision as $n_d$ for d from 1 to D. During each selection decision, a feature vector is computed for each customer request and the feature vectors computed for the selection decision are denoted as $x_{d,j}$ for j from 1 to $n_d$. Accordingly, for selection decision d, let $x_{d,1} \ldots x_{d,n_d}$ denote the feature vectors for the customer requests awaiting assignment to a customer service representative. For selection decision d, selection scores are computed for each feature vector and let $s_{d,1} \ldots s_{d,n_d}$ denote the selection scores computed for selection decision d.

At each selection decision, a customer request is selected. For selection decision d, let $S_d$ denote the number of the selected customer request ($S_d$ will be in the range of 1 to $n_d$). For example, where a customer request corresponding to a highest selection score is selected, $S_d$ is argmax($s_{d,1}, \ldots,$ $s_{d,n_d}$) and the feature vector corresponding to the selected request is $x_{d,S_d}$. Accordingly, request $S_d$ is selected for assignment to the available customer service representative in selection decision step d. A reward score may be computed for each selection decision as described above (or the same reward score may be used for all selection decisions of the time period). The reward scores and the selection decision may then be used to improve the selection model.

In some implementations, only the selection decisions having the highest reward scores may be used to improve the selection model. Using only selection decisions with the highest reward scores may provide the selection model with positive feedback to reinforce good decisions made by the selection model. Where Q selection decisions with the highest reward scores are used to update the selection model (where Q may be a fixed number, a percentage of selection decisions, or any other appropriate number), the highest scoring selection decisions may be denoted as $q_1 \ldots q_Q$. Accordingly, the feature vectors corresponding to the highest scoring selection decisions may be denoted as $x_{q_j,S_{q_j}}$ for j from 1 to Q. A linear model may then be updated by computing an updated mean vector and covariance matrix:

$$m_{new} = \frac{1}{Q}\sum_{j=1}^{Q} x_{q_j,S_{q_j}}$$

$$C_{new} = \frac{1}{Q}\sum_{j=1}^{Q} (x_{q_j,S_{q_j}} - m_{new})^2$$

In another example, the policy gradient method can be used to train the selection model. For example, if the selection model is a multi-layer perceptron with weight matrices $W_1$ and $W_2$, bias vectors $b_1$ and $b_2$, and non-linearity σ, the model can be updated in the following steps. As above, let D be the number of selection decisions during time step i, let $n_d$ be the number of customer requests pending for selection decision d, denote the feature vectors for decision d as $x_{d,1} \ldots x_{d,n_d}$, and denote the scores computed from the feature vectors as $s_{d,1} \ldots s_{d,n_d}$. Further, as above, the number of the selected request at decision d may be denoted as $S_d$. In some implementations, a customer request may be selected by creating a discrete probability distribution from the scores and sampling the distribution as described above. A reward score (or possible multiple reward scores) and the selection decisions may then be used to improve the selection model.

In some implementations, the selection model may be updated using stochastic gradient descent. As above, let $R_i$ denote the reward score for time period i. Let $p_{d,1} \ldots p_{d,n_d}$ denote a discrete probability distribution computed from the selection scores for the $n_d$ customer requests that were pending during selection decision d. A loss function L for the D selection decisions of time step i may be computed as $$L = -\sum_{d=1}^{D} R_i \log(p_{d,S_d})$$

The loss function weights the negative log probability of making selection decision d by the reward score.

Where the reward score is positive, the decisions made during the time period are treated as good decisions, and these types of decisions are reinforced in the selection model so that the selection model continues to make good decisions. Although not all of the decisions may have been good decisions, since the reward score is positive, presumably there are more good decisions than bad decisions.

Where the reward score is negative, the decisions made during the time period are treated as bad decisions, and these types of decisions are suppressed in the selection model so that the selection model avoids making the same bad decisions in the future. Although not all of the decisions may have been bad decisions, since the reward score is negative, presumably there are more bad decisions than good decisions.

During the training process it may not be known whether any individual decisions are good decisions or bad decisions, but by appropriately using reward scores, the good decisions may, on average, be reinforced at each iteration, and the bad decisions may, on average, be discouraged at each iteration.

Where reward scores are computed for each selection decision (e.g., computing an $R_i^d$ for each selection decision), individual selection decisions that received positive rewards may be reinforced and individual selection decisions that received negative rewards may be discouraged.

A selection model, such as a multi-layer perceptron may be updated using stochastic gradient descent with the loss function. For example, the parameters of the selection model may be computed as:

$$W_{1_{new}} = W_1 - \lambda \frac{\partial L}{\partial W_1}$$

$$W_{2_{new}} = W_2 - \lambda \frac{\partial L}{\partial W_2}$$

$$b_{1_{new}} = b_1 - \lambda \frac{\partial L}{\partial b_1}$$

$$b_{2_{new}} = b_2 - \lambda \frac{\partial L}{\partial b_2}$$

where λ is a small number (e.g. 0.001) called the learning rate.

The above training process may be referred to as reinforcement learning. Reinforcement learning may differ from other techniques for training mathematical models (such as supervised learning) in that no labeled training data may be available. With supervised learning, a corpus of training data may be available that has been labeled (e.g., denoting choices as good choices or bad choices), and the mathematical model may learn rules for making good choices from the labeled examples in the training data.

By contrast, with reinforcement learning, no labeled training data may be available for the mathematical model to learn from. Instead, the mathematical model may learn based on the performance of the model during a time period. For example, if the model performed well during the time period or if it performed better or worse than a previous time period. The performance of the mathematical model during a time period may be quantified as a reward score, such as a reward score that is positive to indicate that the mathematical model performed well during the time period and negative to indicate that the mathematical model did not perform well during the time period.

Accordingly, with reinforcement learning, when the selection model makes choices, it may not be known whether the choice is a good choice or a bad choice. Further, at the time of training or updating the selection model, it may still not be known whether any individual choice was a good choice or a bad choice. In some implementations, the selection model make a probabilistic choice by sampling a probability distribution (e.g., by sampling the multinomial distribution that is parameterized by the selection scores) instead of selecting a highest scoring choice. Using a probabilistic choice allows the selection model to make choices that are different from the best choice (based on the current model parameters), and thus to possibly learn from its mistakes or to learn that the currently-believed best choice isn't actually the best choice.

With reinforcement learning, the feedback to the mathematical model is a reward score that indicates the performance of the mathematical model during the time period but does not indicate whether any individual selection decision was a good decision or a bad decision. This reward score, however, may be sufficient for the mathematical model to learn and improve its selection decisions. If the reward score is positive, then during the time period, the mathematical model likely made more good choices than bad choices, and the model can learn to reinforce those choices. If the reward score is negative, then during the time period, the mathematical model likely made more bad choices than good choices, and the model can learn to discourage those choices.

Reinforcement learning may need more training iterations to learn to make good selection decisions than supervised learning since the reward score may provide more general information instead of providing information about individual selection decisions. In some applications, however, labeled training data may not be available, and thus supervised learning may not be possible. Accordingly, reinforcement learning may allow for the training of mathematical models in situations where supervised learning is not possible.

Another benefit of reinforcement learning is that may allow mathematical models to learn to make selection decisions based on criteria that are not possible with supervised learning. For example, it may be desired to train a selection model that maximizes the rate of processing customers. This criteria may not allow a label to be associated with an individual selection decision because there may not be any information available that is specifically relevant to an individual selection decision (as opposed to, for example, a customer rating of a customer support session that is relevant to the customer support session). Because there may not be a relevant label for an optimization criteria, supervised learning may not be possible for some criteria. By contrast, since reinforcement learning does not need labeled training data, it may be able to optimize mathematical models for any suitable optimization criteria.

Model Initialization

Techniques for updating a selection model are described above, but since an existing model is updated, an initial selection model may need to be created using other techniques. In some implementations, it may be desirable to initialize the selection model so that it performs similar to a previous selection decision method, such as order or receipt or first-come-first-serve. As such, the initial parameters of the selection model may be chosen to favor maximum customer wait time over other features. This has the effect that the customer waiting the longest will initially have a large selection decision score and mimicking a first-come-first-serve selection of requests. For example, for a linear model with parameters sampled from a multivariate normal distribution with mean m and variance C, m can be chosen to initially have value 1 in the coordinate corresponding to the customer wait time feature and 0 (or some small number) in all other coordinates, and C can be chosen to have small values in all coordinates.

In some implementations, annealing may be used to initially favor customer wait time and gradually increase the weight of a selection model. For example, the selection scores may be computed as a weighted sum of the score computed by the selection model and the customer wait time.

$$s = \alpha * s_{model} + (1-\alpha) * w$$

where w is the wait time of a customer request and a is a number that starts at 0 and is slowly increased to 1 over time. This has the effect that the customer waiting the longest will initially have the largest selection score and mimics the first-come-first-serve selection decision model.

Example Process Flow

FIG. 3 illustrates an example process flow for updating a selection model over several time periods. In the first time period, a first selection model 311 is used to select customer requests for assignment to customer service representatives. Each time a customer service representative becomes available to process a customer request, the first selection model 311 may be used to select a customer request from a group of pending customer requests that are awaiting assignment to a customer service representative. The first selection model may include any of the models described above. The act of selecting a customer request from a group of pending customer requests may be referred to as a selection decision. All of the selection decisions made during the first time period may be referred to collectively as first selection decisions 312. A first performance score 313 may also be computed that relates to the performance of first selection model 311 during the first time period. For example, first performance score 313 may be a rate of processing customer requests, an average customer satisfaction rating, or a combination of the two.

In the second time period, second selection model 321 is used to select customer requests for assignment to customer service representatives. Second selection model 321 may be created using any appropriate techniques, such as by modifying or updating first selection model 311 using the first performance score 313. For example, reinforcement learning may be used to generate second selection model 321 by modifying parameters for first selection model 311. During the second time period, multiple selection decisions may be made and referred to as second selection decisions 322. A second performance score 323 may also be computed that relates to the performance of second selection model 321 during the second time period.

Reward calculation component 324 may compute a reward score using the second performance score 323, and in some implementations, may also use the first performance score 313. In some implementations, the reward score may be the same as the second performance score 323. Model update component 325 may process the second selection decisions 322 and the reward score to train or update the parameters of the second selection model 321 to generate third selection model 331. Any of the techniques described above may be used to generate the third selection model 331 from the second selection model 321.

This process may be repeated for future time periods. For example, the third selection model 331 may be used during a third time period to make third selection decisions 332. A third performance score 333 may be computed that relates to the performance of the third selection model 331 during the third time period. Reward calculation component 334 may compute a reward score using the third performance score 333 and optionally the second performance score 323. Model update component 335 may train or update the parameters of third selection model 331 to generate fourth selection model 341 and so forth.

Figure 4:
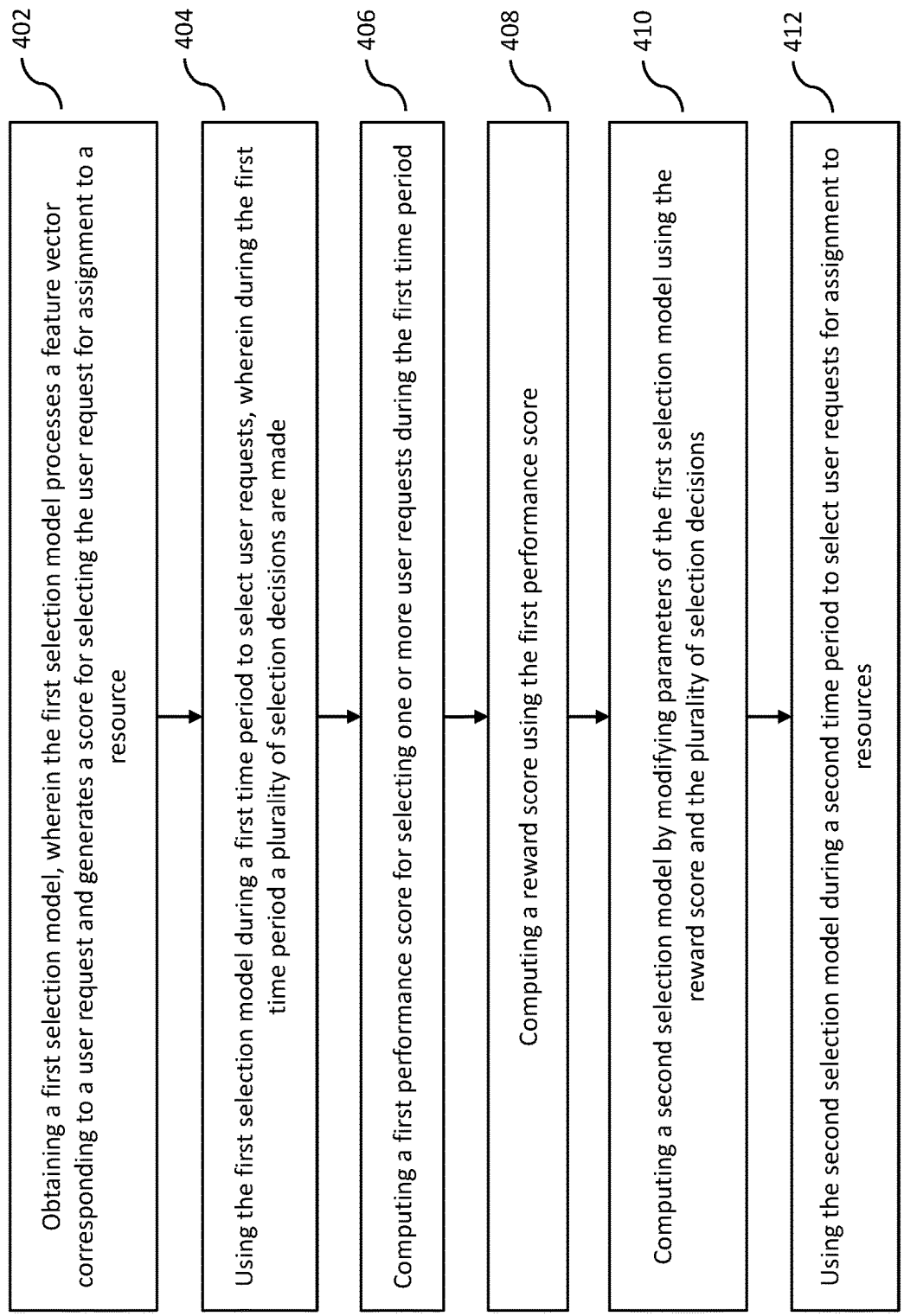
FIG. 4 presents a process flow diagram for updating a selection model for selecting customer requests for assignment to customer service representatives.

Referring to FIG. 4, a process flow diagram is presented for updating a selection model for selecting user requests, such as customer requests. In a first step 402, a first selection model may be obtained, wherein the first selection model processes a feature vector corresponding to a user request and generates a score for selecting the user request for assignment to a resource, such as a customer service representative. In some implementations, the first selection model may include a linear model (e.g. with parameters sampled from a multivariate normal distribution), a multi-layer perceptron neural network, and the like. In some implementations, the feature vector may include features relating to the user request or the user making the user request, such as a wait time for the request, a category of the request, a sentiment of the request, the urgency of the request, and the like. In some implementations, the feature vector may include features relating to the resource, such as a skill level or characteristic of the resource (e.g., customer representative), and the like.

In a second step 404, the first selection model may be used during a first time period to select user requests, wherein during the first time period a plurality of selection decisions are made.

In a third step 406, a first performance score may be computed for selecting one or more user requests during the first time period. Any appropriate performance score may be used. In some implementations, the first performance score may be a user satisfaction rating or a rate of processing user requests.

In a fourth step 408, a reward score may be computed using the first performance score. In some implementations, no other performance scores are used in computing the reward score, and, in some implementations, a second performance score from a previous time period may be used in computing the reward score. Where the second performance score is used in computing the reward score, the reward score may be positive if the first performance score is greater than the second performance score and negative if the second performance score is greater than the first performance score. In some implementations, multiple performance scores may be computed for the first time period and the reward score may by computed by weighting the multiple performance scores for the time period.

In a fifth step 410, a second selection model is trained or computed by modifying parameters of the first selection model, wherein training the second selection model comprises updating the parameters of the first selection model using the reward score and the plurality of selection decisions. In some implementations, computing the second selection model may include using a cross entropy method, a policy gradient algorithm, and the like.

In a sixth step 412, the second selection model may be used during a second time period to select user requests for assignment to resources. The process of FIG. 4 may be repeated for successive time periods.

Figure 5:
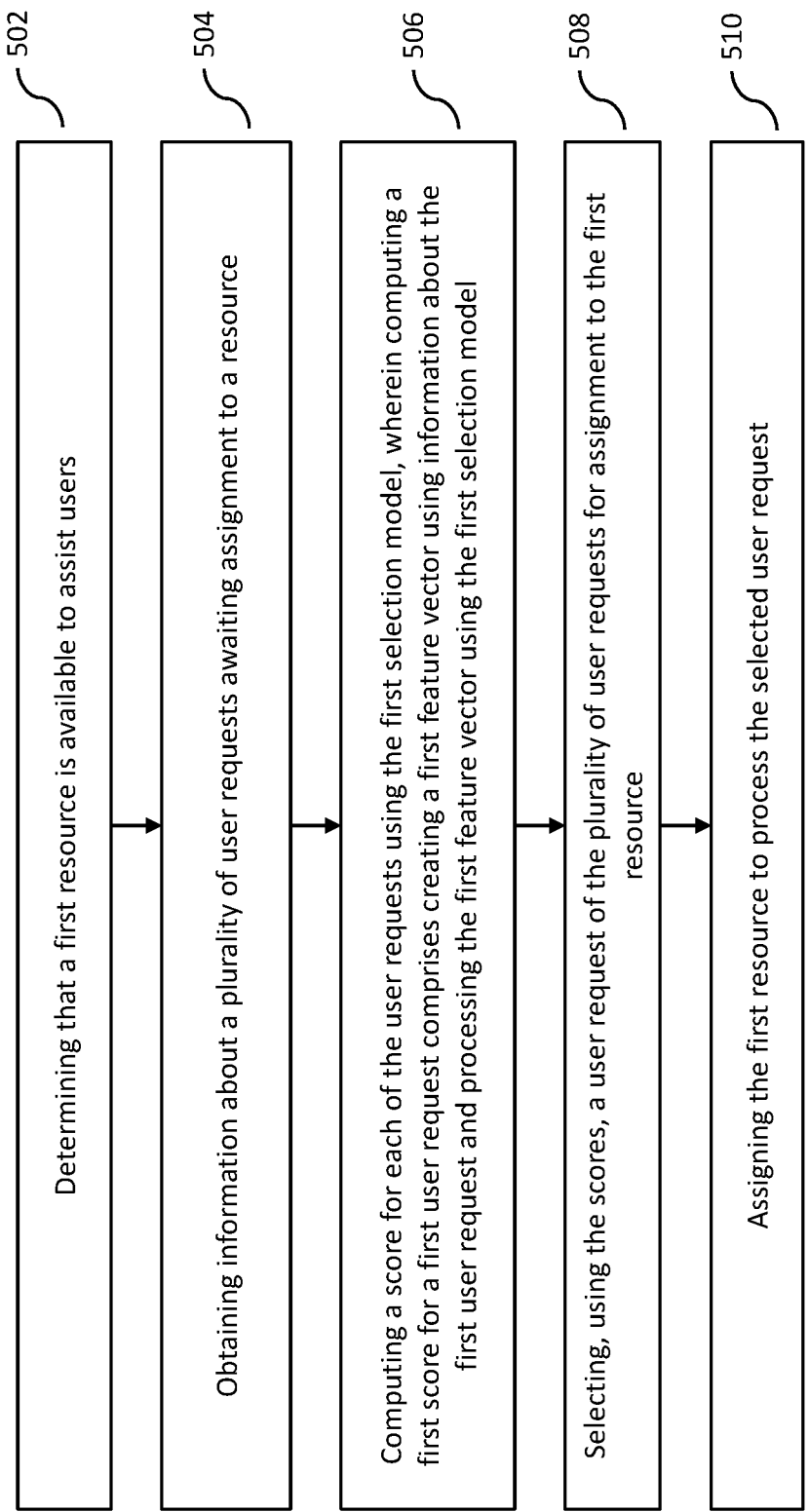
FIG. 5 presents a process flow diagram for selecting a customer request from among customer requests awaiting assignment to a customer service representative.

Referring to FIG. 5, a process flow diagram is presented for selecting a user request using a selection model. In a first step 502, it is determined that a first resource (e.g., a first customer service representative) is available to assist users (e.g., customers). In a second step 504, information about a plurality of user requests awaiting assignment to a resource may be obtained. In a third step 506, a score may be computed for each of the user requests using the first selection model, wherein computing a first score for a first user request comprises creating a first feature vector using information about the first user request and processing the first feature vector using the first selection model. In a fourth step 508, using the scores, a user request of the plurality of user requests may be selected. In some implementations, the user request may be selected by selecting a user request having a highest score, selecting a user request using a probability distribution computed from the scores, and the like. In a fifth step 510, the first resource may be assigned to process the selected user request. For example, a customer service representative may be assigned to assist a customer.

It can be seen that the systems and methods of the present disclosure provide for embodiments that improve the servicing of customer service requests, including providing capabilities not available in previously known systems and methods. For example, in certain embodiments, the use of a probability distribution allows for more rapid learning, improvement, and convergence of a neural network in making customer service selection decisions, and improved distribution of customer service resources compared to previously known systems. In a further example, the use of a probability distribution allows for the neural network and/or model to continue improvement where an otherwise highest scoring solution is not the actual optimal solution, or where conditions change and the otherwise highest scoring solution is no longer the optimal solution. In another example, reinforcement learning (e.g., using a reward score) provides for greater flexibility and capability than previously known systems. In a further example, reinforcement learning allows for training without having labeled training data, allows for capability to improve or optimize criteria that cannot be labeled or scored directly, and/or allows for optimization at a higher level than the individual resource decision level—such as for the performance of the model across a number of decisions, over a period of time, and/or to respond to changes in success criteria over time or operating conditions, without requiring re-labeling or re-characterization of training data.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for using a neural network to select customer requests for assignment, the method comprising:
  obtaining a first selection model, wherein the first selection model comprises the neural network and processes feature vectors corresponding to customer requests and generates scores for selection of customer requests for assignment;
  using the first selection model during a first time period to select customer requests, wherein, during the first time period, a plurality of selection decisions are made, and wherein a first selection decision of the plurality of selection decisions comprises:
    determining that a first customer service representative is available for assignment,
    obtaining information about a plurality of customer requests awaiting assignment, computing a probability distribution for the plurality of customer requests using the first selection model, wherein computing the probability distribution comprises computing a selection score for a first customer request by (i) creating a first feature vector using information about the first customer request and (ii) processing the first feature vector using the first selection model, sampling the probability distribution to select the first customer request from the plurality of customer requests for assignment to the first customer service representative, and assigning the first customer service representative the selected first customer request;

computing a reward score wherein the reward score indicates a performance of the first selection model during the first time period and is computed using at least two of the plurality of selection decisions, wherein the reward score is computed by comparing the performance of the first selection model during the first time period to the performance of a third selection model during a third time period, wherein the third time period is prior to the first time period;

computing a second selection model by modifying parameters of the first selection model using the reward score and the plurality of selection decisions; and using the second selection model during a second time period to select a second customer request for assignment to a second customer service representative.

2. The method of claim 1, wherein the first time period comprises an hour, a day, or a week.

3. The method of claim 1, wherein the reward score is:
positive if the performance of the first selection model during the first time period is better than the performance of the third selection model during the third time period; and
negative if the performance of the first selection model during the first time period is worse than the performance of the third selection model during the third time period.

4. The method of claim 1, wherein the third selection model assigned customer requests by order of receipt.

5. The method of claim 1, wherein the first feature vector comprises features relating to a wait time of the first customer request, a category of the first customer request, a sentiment of the first customer request, an urgency of the first customer request, information obtained from a customer account of a customer of the first customer request, or previous customer requests of the customer of the first customer request.

6. The method of claim 1, wherein the first feature vector comprises features relating to the customer service representative.

7. The method of claim 1, comprising computing a second reward score wherein the second reward score indicates a second performance of the first selection model during the first time period and is computed using at least two of the plurality of selection decisions.

8. The method of claim 7, wherein computing the second selection model comprises weighting the reward score and the second reward score.

9. The method of claim 1, wherein the first selection model comprises a linear model or a multi-layer perceptron neural network.

10. The method of claim 1, wherein computing the second selection model comprises using a policy gradient method.

11. The method of claim 1, wherein computing the probability distribution comprises computing a softmax function of selection scores.

12. A system for using a neural network to select customer requests for assignment, the system comprising:
at least one server computer comprising at least one processor and at least one memory, the at least one server computer configured to:
obtain a first selection model, wherein the first selection model comprises the neural network and processes feature vectors corresponding to customer requests and generates scores for selection of customer requests for assignment;
use the first selection model during a first time period to select customer requests, wherein, during the first time period, a plurality of selection decisions are made, and wherein a first selection decision of the plurality of selection decisions comprises:
determining that a first customer service representative is available for assignment,
obtaining information about a plurality of customer requests awaiting assignment,
computing a probability distribution for the plurality of customer requests using the first selection model, wherein computing the probability distribution comprises computing a selection score for a first customer request by (i) creating a first feature vector using information about the first customer request and (ii) processing the first feature vector using the first selection model,
sampling the probability distribution to select the first customer request from the plurality of customer requests for assignment to the first customer service representative, and
assigning the first customer service representative the selected first customer request;
compute a reward score wherein the reward score corresponds to a performance of the first selection model during the first time period, wherein the reward score is computed by comparing the performance of the first selection model during the first time period to the performance of a third selection model during a third time period, wherein the third time period is prior to the first time period;
compute a second selection model by modifying parameters of the first selection model using the reward score and the plurality of selection decisions; and
use the second selection model during a second time period to select a second customer request for assignment to a second customer service representative.

13. The system of claim 12, wherein the reward score is computed using (i) an average of customer satisfaction ratings corresponding to the plurality of selection decisions or (ii) a rate of processing customer requests during the first time period.

14. The system of claim 12, comprising computing a second reward score wherein the second reward score indicates a second performance of the first selection model during the first time period and is computed using at least two of the plurality of selection decisions.

15. The system of claim 12, wherein the reward score is:
positive if the performance of the first selection model during the first time period is better than the performance of the third selection model during the third time period; and negative if the performance of the first selection model during the first time period is worse than the performance of the third selection model during the third time period.

16. One or more non-transitory, computer-readable media comprising computer executable instructions that, when executed, cause at least one processor to perform actions comprising:

obtaining a first selection model, wherein the first selection model processes feature vectors corresponding to customer requests and generates scores for selection of customer requests for assignment;

using the first selection model during a first time period to select customer requests, wherein, during the first time period, a plurality of selection decisions are made, and wherein a first selection decision of the plurality of selection decisions comprises:

determining that a first customer service representative is available for assignment, obtaining information about a plurality of customer requests awaiting assignment, computing a probability distribution for the plurality of customer requests using the first selection model, wherein computing the probability distribution comprises computing a selection score for a first customer request by (i) creating a first feature vector using information about the first customer request and (ii) processing the first feature vector using the first selection model, sampling the probability distribution to select the first customer request from the plurality of customer requests for assignment to the first customer service representative, and assigning the first customer service representative to the selected first customer request;

computing a reward score wherein the reward score indicates a performance of the first selection model during the first time period, wherein the reward score is computed by comparing the performance of the first selection model during the first time period to the performance of a third selection model during a third time period, wherein the third time period is prior to the first time period;

computing a second selection model by modifying parameters of the first selection model using the reward score and the plurality of selection decisions; and using the second selection model during a second time period to select a second customer request for assignment to a second customer service representative.

17. The one or more non-transitory, computer-readable media of claim 16, wherein the first feature vector comprises features relating to a wait time of the first customer request, a category of the first customer request, a sentiment of the first customer request, or an urgency of the first customer request.

18. The one or more non-transitory, computer-readable media of claim 16, wherein the first selection model comprises a linear model or a multi-layer perceptron neural network.

* * * * *

UNITED STATES PATENT AND TRADEMARK OFFICE
CERTIFICATE OF CORRECTION

PATENT NO. : 10,762,423 B2
APPLICATION NO. : 16/057438
DATED : September 1, 2020
INVENTOR(S) : Shawn Henry Page 1 of 1

It is certified that error appears in the above-identified patent and that said Letters Patent is hereby corrected as shown below:

In the Specification

In Column 7, Line 15, delete "a," and insert -- $\sigma$, --, therefor.

In Column 7, Line 30, delete ". $S_N$" and insert -- . , $S_N$ --, therefor.

In Column 9, Line 18, delete "$R_1$" and insert -- $R_i$ --, therefor.

In Column 10, Line 4, delete "$\tilde{R}_i^d$" and insert -- $\hat{R}_i^d$ --, therefor.

In Column 10, Line 34, delete "$R_1$" and insert -- $R_i$ --, therefor.

In Column 11, Line 51, delete "$R_1$" and insert -- $R_i$ --, therefor.

In Column 14, Line 12, delete "a" and insert -- $\alpha$ --, therefor.

Signed and Sealed this
Fifteenth Day of December, 2020

Andrei Iancu
*Director of the United States Patent and Trademark Office*